United States Patent
Hsu

(10) Patent No.: US 7,159,227 B2
(45) Date of Patent: Jan. 2, 2007

(54) CD-ROM DRIVE CAPABLE OF RAPIDLY DETACHING AND INSTALLING

(75) Inventor: Hsin An Hsu, Taipei (TW)

(73) Assignee: First International Computer, Inc., Taipei (TW)

( * ) Notice: Subject to any disclaimer, the term of this patent is extended or adjusted under 35 U.S.C. 154(b) by 544 days.

(21) Appl. No.: 10/644,832

(22) Filed: Aug. 21, 2003

(65) Prior Publication Data

US 2005/0044556 A1 Feb. 24, 2005

(51) Int. Cl.
*G11B 33/02* (2006.01)
*G06F 1/16* (2006.01)

(52) U.S. Cl. .................. 720/657; 361/685; 720/600
(58) Field of Classification Search ........... 720/600, 720/610, 639, 657; 361/683–686; 312/223.2
See application file for complete search history.

(56) References Cited

U.S. PATENT DOCUMENTS

| | | | | |
|---|---|---|---|---|
| 5,305,180 A | * | 4/1994 | Mitchell et al. | 361/685 |
| 5,432,673 A | * | 7/1995 | Ogami et al. | 361/684 |
| 5,947,572 A | * | 9/1999 | Chang | 312/332.1 |
| 6,370,022 B1 | * | 4/2002 | Hooper et al. | 361/685 |
| 6,378,965 B1 | * | 4/2002 | Reznikov et al. | 312/332.1 |
| 6,606,241 B1 | * | 8/2003 | Moore | 361/685 |
| 6,853,549 B1 | * | 2/2005 | Xu | 361/685 |
| 2004/0004927 A1 | * | 1/2004 | Ahn | 369/75.2 |

FOREIGN PATENT DOCUMENTS

JP 2002269966 A * 9/2002

* cited by examiner

*Primary Examiner*—William J Klimowicz
(74) *Attorney, Agent, or Firm*—Bacon & Thomas, PLLC

(57) ABSTRACT

The present invention is to provide a CD-ROM drive capable of rapidly detaching and installing, which comprises a frame mounted in a case of a computer. The frame comprises a side opening, an interior cavity in communication with the side opening so that the CD-ROM drive can be mounted in the cavity through the side opening, and an elongated fastening assembly at a side of the cavity. The fastening assembly comprises an elongated sliding member capable of moving toward or away from the side opening, and an elongated fastening member capable of moving toward or away from the CD-ROM drive. After mounting the CD-ROM drive in the cavity, it is possible of manipulating the sliding member to move the fastening member for fastening or detaching the CD-ROM drive to or from the frame.

9 Claims, 6 Drawing Sheets

CD-ROM DRIVE CAPABLE OF RAPIDLY DETACHING AND INSTALLING

FIELD OF THE INVENTION

The present invention relates to a CD-ROM drive, and more particularly to a fastening mechanism being capable of rapidly detaching a CD-ROM drive from a computer (e.g., notebook computer) and installing the same in the computer.

BACKGROUND OF THE INVENTION

Electronics industry and its associated industries have known a rapid, spectacular development as time evolves. Further, all kinds of high-technology products and communication products related to computer technology are commercially available. The fast development of the new products not only advantageously influences our daily life and work, but also brings a great convenience to people. In response to all kinds of new information products being developed, especially notebook computers, most users become more critical with respect to the convenience in using them. Thus, whether electronic products manufactured in the future can provide a more convenient and effective service to customers will be an indicator to decide whether sale revenue and manufacturing technology of one large electronic company are higher and more advanced than other competitive ones respectively.

For meeting the increasing consumer demand about computers, a high-technology company has to not only maintain good quality of its products, but also increase the manufacturing speed. In brief, each portion of an assembly line, whether important or not, will affect the manufacturing speed. For example, the speed of installing a CD-ROM drive in a computer is one of important factors that affect the increase of the computer assembly speed. It is understood that competition among computer manufacturing companies is very fierce. Thus, one computer manufacturing company cannot have a large share of the computer market if both the computer assembly speed of the company is low and quality of computers produced by the company is poor. To the worse, the company may be eliminated from the competitive computer market.

However, typically, a plurality of screws are employed to fasten a CD-ROM drive in the computer in the installation process. This has a drawback of low in assembly speed. Similarly, in a case of removing a malfunctioned CD-ROM drive for maintenance or replacement, a user has to sequentially detach the computer case, unfasten the screws by means of a screw driver, disconnect all power and data cables from the CD-ROM drive, and finally detach the CD-ROM drive from the computer case. As such, it is a tedious, time consuming, and labor intensive process during computer assembly. Similar drawbacks are also found in maintenance. This is an undesirable design. Further, it contradicts the trend of low cost, high efficiency, and mass production as pursued by modern industries.

Thus, it is desirable among vast consumers and computer manufacturers to provide a novel fastening mechanism capable of rapidly detaching a CD-ROM drive from a computer and installing the same in the computer in order to overcome the above drawbacks of the prior art.

SUMMARY OF THE INVENTION

A primary object of the present invention is to provide a CD-ROM drive capable of rapidly detaching and installing for overcoming the above drawbacks of the prior art. These drawbacks are that a plurality of screws are employed to fasten a CD-ROM drive in the computer. For removing a malfunctioned CD-ROM drive, a user has to sequentially detach the computer case, unfasten the screws, disconnect all power and data cables from the CD-ROM drive, and finally detach the CD-ROM drive from the computer case.

One object of the present invention is to provide a CD-ROM drive capable of rapidly detaching and installing. The CD-ROM drive comprises a frame mounted in a case of a computer, the frame comprising a side opening, an interior cavity in communication with the side opening so that the CD-ROM drive can be mounted in the cavity through the side opening, and an elongated fastening assembly at a side of the cavity, the fastening assembly comprising an elongated sliding member capable of moving toward or away from the side opening, and an elongated fastening member capable of moving toward or away from the CD-ROM drive. After mounting the CD-ROM drive in the cavity, it is possible of manipulating the sliding member to move the fastening member for urging and further fastening the CD-ROM drive. Alternatively, a disengagement of the fastening member from the CD-ROM drive facilitates a user to detach the CD-ROM drive from the frame thereafter.

The above and other objects, features and advantages of the present invention will become apparent from the following detailed description taken with the accompanying drawings.

DETAILED DESCRIPTION OF THE PREFERRED EMBODIMENTS

Figure 1:
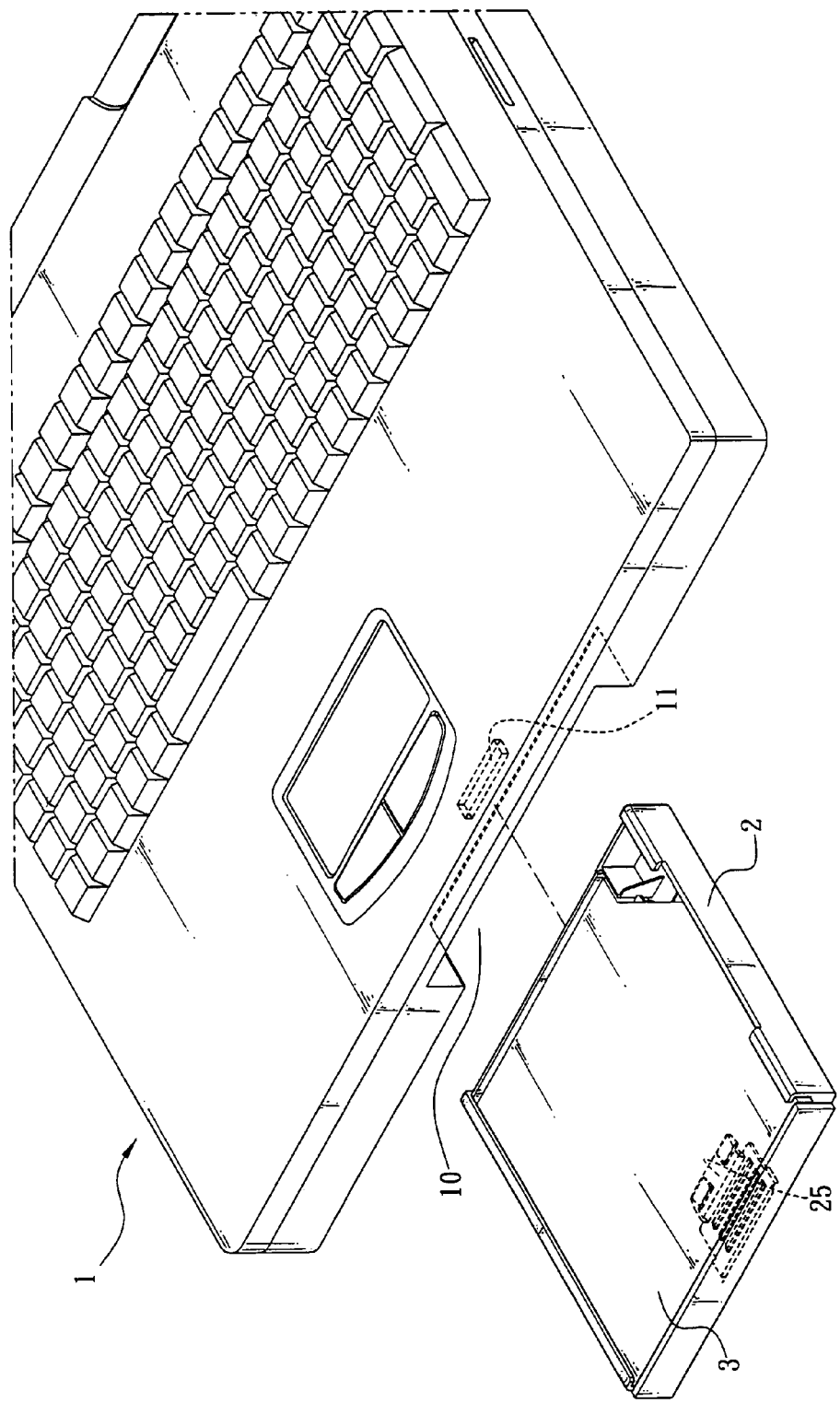
FIG. 1 is a perspective view illustrating the installation of a CD-ROM drive in a notebook computer in which the CD-ROM drive is mounted in a frame having a fastening mechanism according to the invention.

Referring to FIGS. 1 to 6, there is shown a CD-ROM drive capable of rapidly detaching and installing in accordance with the invention. The invention comprises a case 1 of a computer, the case 1 comprising a front slot 10; a frame 2 received in the slot 10, the frame 2 comprising a side opening 20, an interior cavity 21 in communication with the opening 20 so that a CD-ROM drive 3 can be mounted in the cavity 21 through the opening 20, and an elongated fastening assembly 22 at a side of the cavity 21, the fastening assembly 22 comprising an elongated sliding member 220 capable of moving toward or away from the opening 20, and an elongated fastening member 221 capable of moving toward or away from the CD-ROM drive 3. After mounting the CD-ROM drive 3 in the cavity 21, it is possible of manipulating the sliding member 220 to move the fastening member 221 for urging and further fastening the CD-ROM drive 3. Alternatively, a disengagement of the fastening member 221 from the CD-ROM drive 3 enables a user to easily detach the CD-ROM drive 3 from the frame 2 thereafter.

Figure 2:
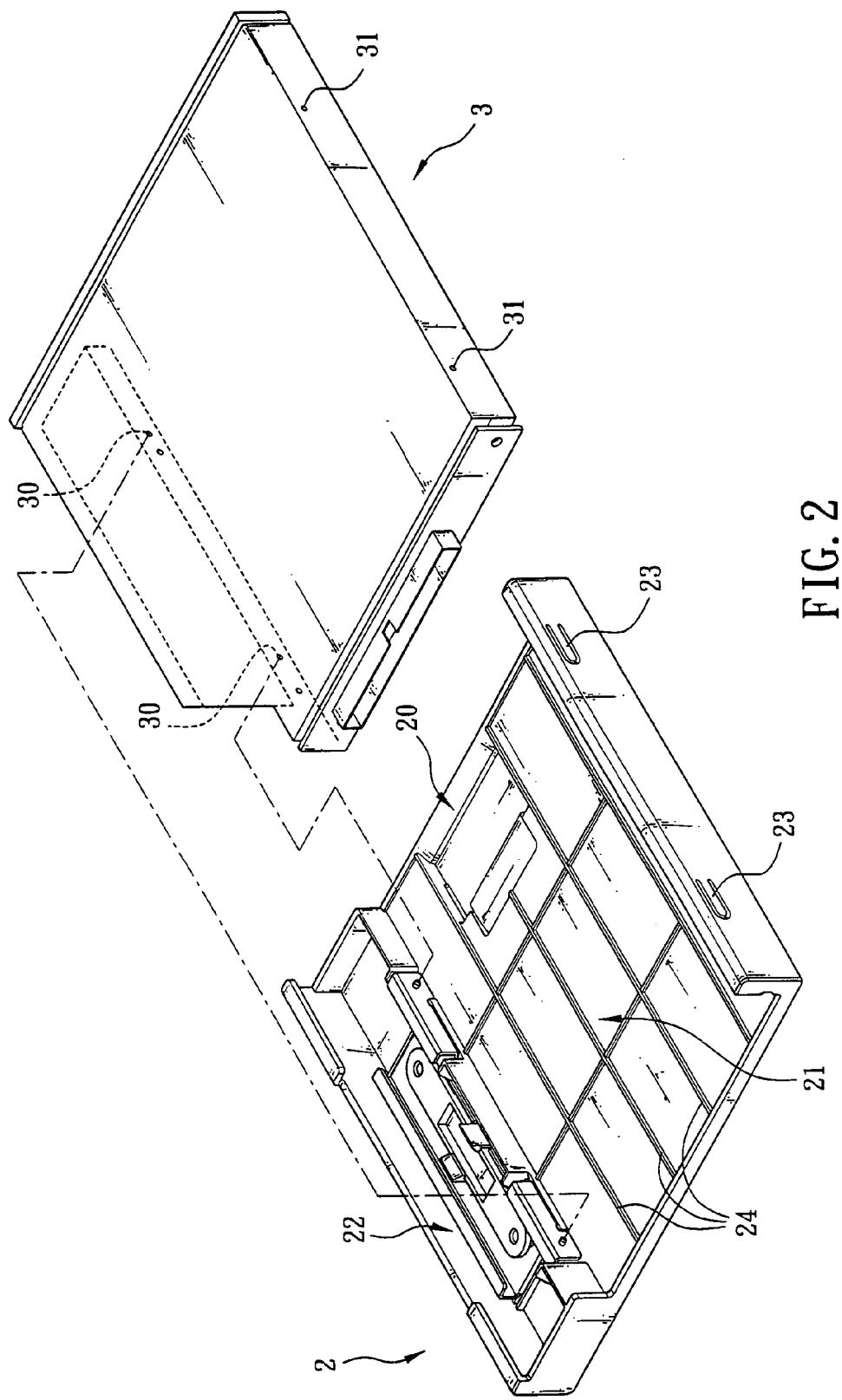
FIG. 2 is a perspective view illustrating the CD-ROM drive mounted in a frame having a fastening mechanism according to the invention.
Figure 3:
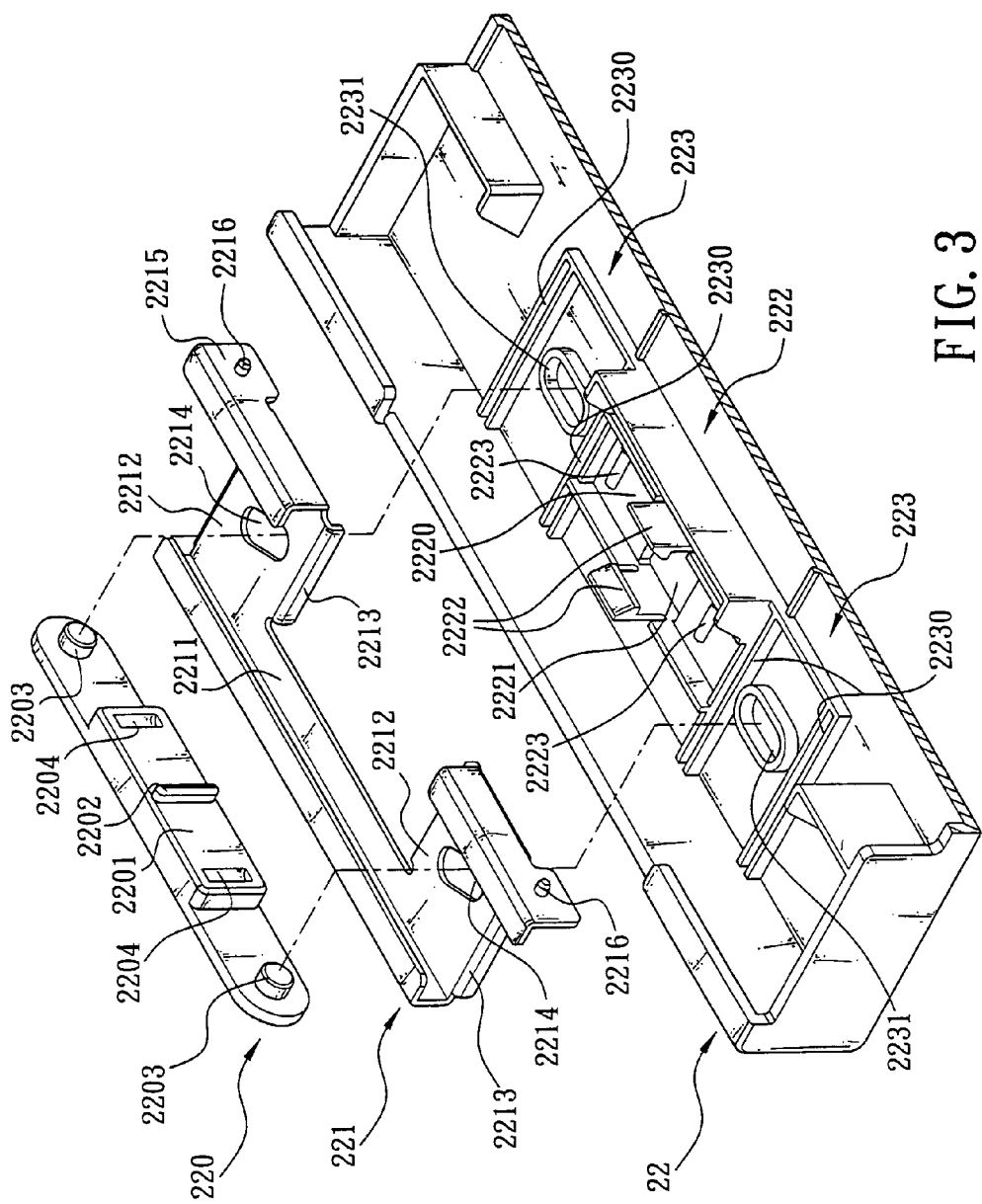
FIG. 3 is an exploded view of the fastening assembly shown in FIG. 2.
Figure 4:
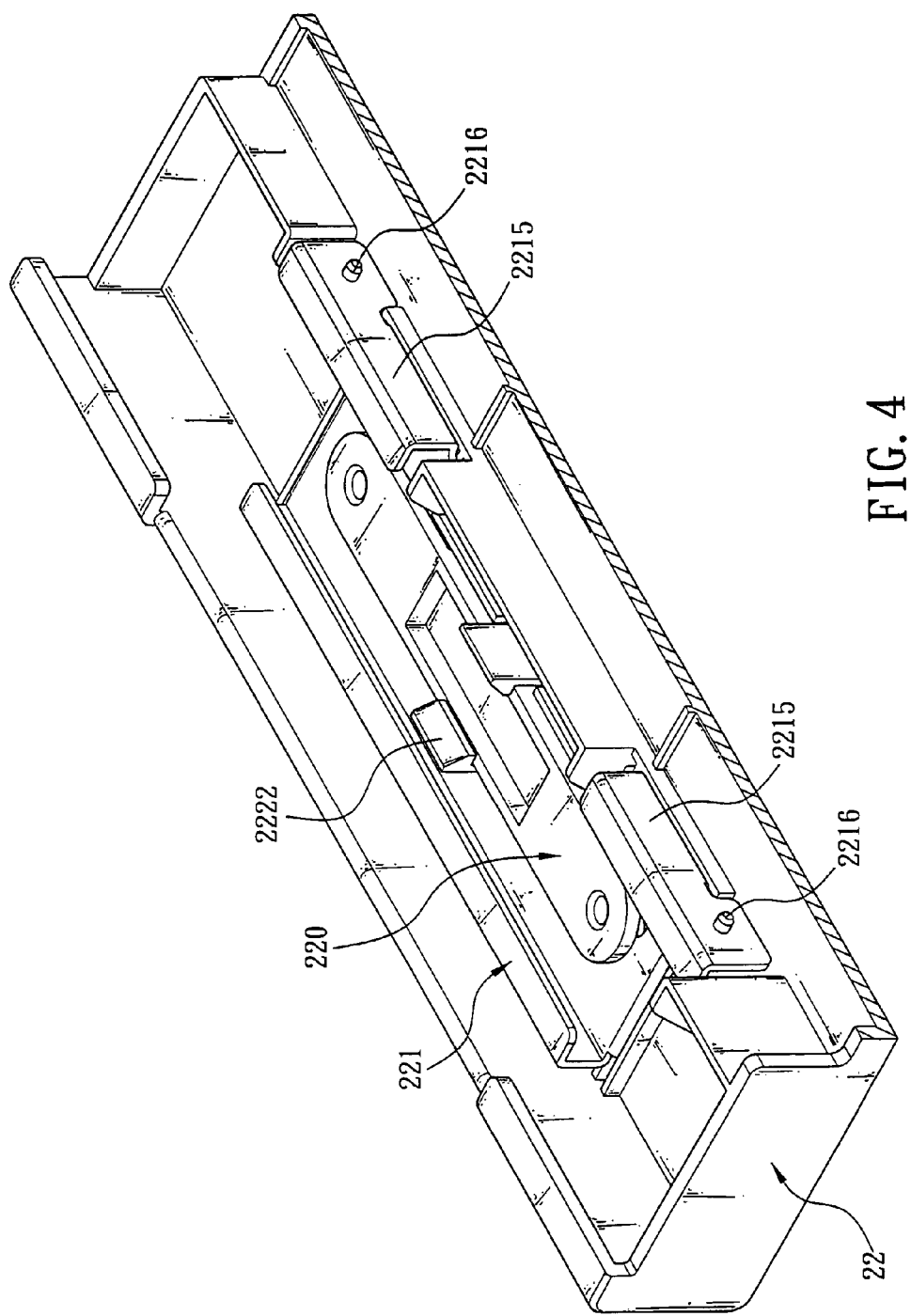
FIG. 4 is an assembled view of the fastening assembly shown in FIG. 3.
Figure 5:
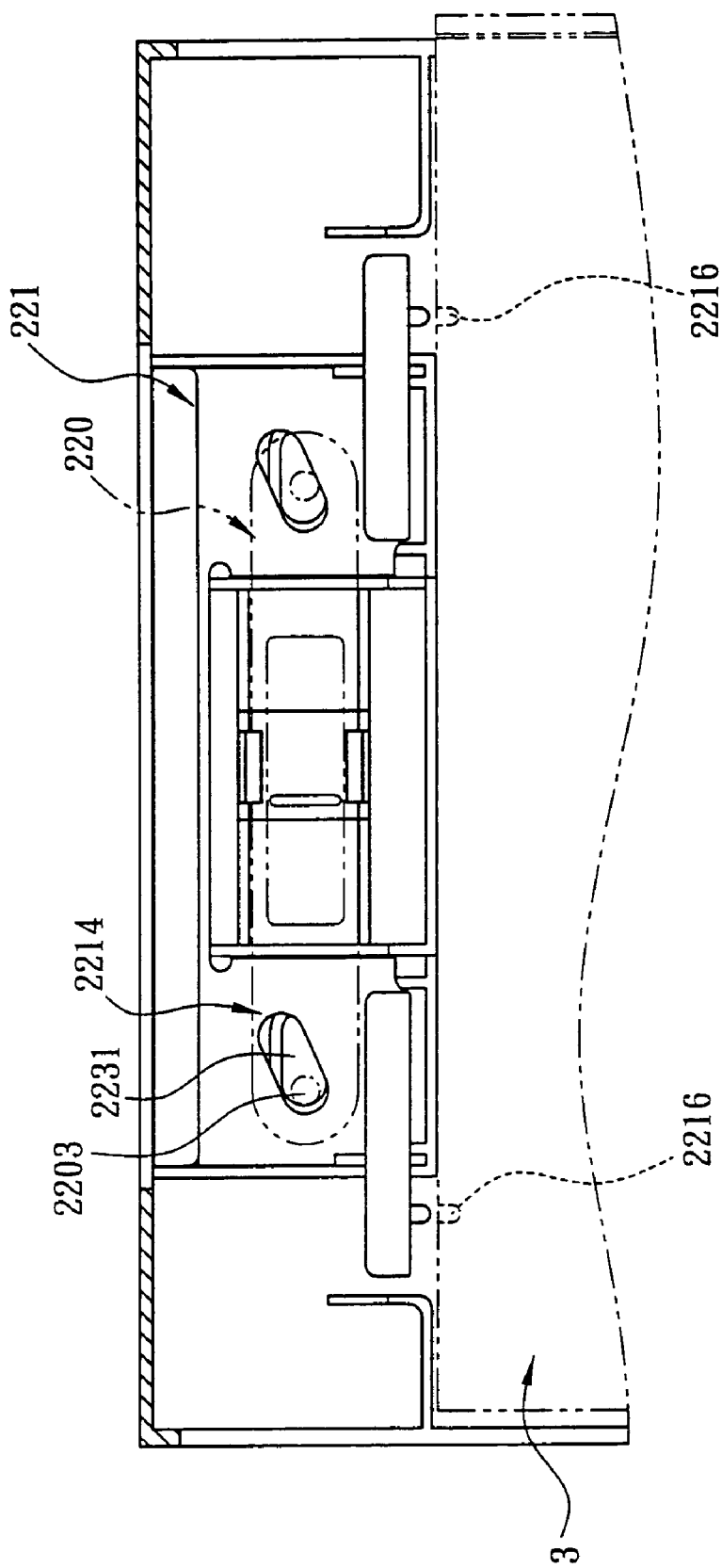
FIG. 5 is a top plan view schematically depicting the fastening assembly in a state prior to fastening the CD-ROM drive.
Figure 6:
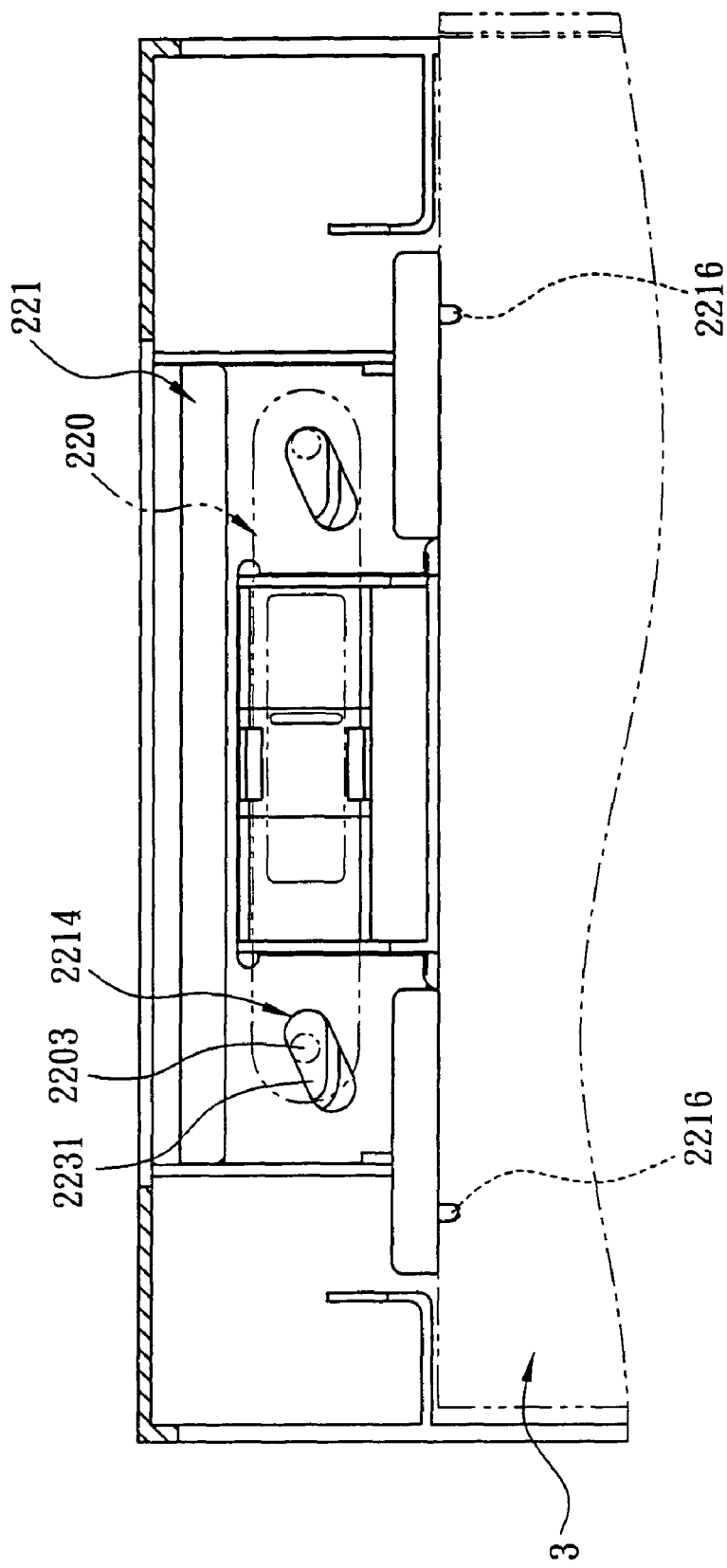
FIG. 6 is a view similar to FIG. 5 where the CD-ROM drive is fastened by the fastening assembly.

Referring to FIGS. 2, 3 and 4, in the invention the fastening assembly 22 further comprises an engagement section 222 on a bottom, the engagement section 222 including a central vertical groove 2220 parallel to a side wall of the cavity 21, an opening 2221 through the frame 2 and in the center of the vertical groove 2220, and an upright latch arm 2222 at either side of the opening 2221, the latch arms 2222 being parallel to the vertical groove 2220; and a groove section 223 adjacent either side of the engagement section 222, the groove section 223 including two parallel, transverse grooves 2230 at both sides of either groove section 223, the transverse grooves 2230 being perpendicular to the vertical groove 2220, and a substantially elliptical limiting slot 2231 in a center of either groove section 223, the limiting slot 2231 being proximate and aligned with the vertical groove 2220 and the transverse groove 2230 being perpendicular to the vertical groove 2220.

The sliding member 220 comprises a sliding piece 2201 on an underside, a finger tab 2202 on the sliding piece 2201, and a short, cylindrical projection 2203 at either end distal from the sliding piece 2201. The sliding piece 2201 is fitted in the vertical groove 2220 when the sliding member 220 is fastened in the engagement section 222 by the latch arms 2222. Also, the finger tab 2202 is projected from the frame 2 by passing the opening 2221. The projections 2203 are defined by the limiting slots 2231. By configuring as above, a user can push the finger tab 2202 to move the sliding piece 2201 along the vertical groove 2220. At the same time, the projections 2203 move along the limiting slots 2231. As an end, the sliding member 220 moves either toward or away from the opening 20.

The fastening member 221 comprises a trough 2211, a guide 2212 proximate either end, a rail 2213 at either end, a slanted slot 2214 on either guide 2212, an abutment surface 2215 projected from either guide 2212, the abutment surfaces 2215 being parallel to the trough 2211, and a peg 2216 protruded from either abutment surface 2215. The slanted slots 2214 and the limiting slots 2231 are partially overlapped when the rails 2213 are fitted in the transverse grooves 2230. This is because the orientation of either slanted slot 2214 is different from that of either limiting slot 2231 (i.e., the slanted slot 2214 is at an acute angle about the limiting slot 2231).

Referring to FIGS. 2, 3, 5 and 6, as stated above, first mount the fastening member 221 prior to mounting the sliding member 220. The projections 2203 pass the slanted slots 2214 prior to being defined in the limiting slots 2231. After mounting the CD-ROM drive 3 in the cavity 21, a user can push the finger tab 2202 to move the sliding member 220 along the vertical groove 2220. At the same time, the projections 2203 move along the limiting slots 2231. As an end, the fastening member 221 moves as the projections 2203 urge against the slanted slots 2214 since the orientation of either slanted slot 2214 is different from that of either limiting slot 2231 in response to the projections 2203 moving along the limiting slots 2231. In brief, a movement of the sliding member 220 will cause the fastening member 221 to move accordingly. As a result, it is possible of moving the fastening member 221 for urging and further fastening the CD-ROM drive 3. Alternatively, a disengagement of the fastening member 221 from the CD-ROM drive 3 enables a user to easily detach the CD-ROM drive 3 from the frame 2 thereafter.

As stated above, a movement of the sliding member 220 will cause the fastening member 221 to move accordingly. As an end, the abutment surfaces 2215 move either toward or away from the CD-ROM drive 3. In this regard, at least one peg (one is shown) 2216 for positioning is provided on either abutment surface 2215. Correspondingly, at least one hole (four are shown) 30 is formed on a side wall of the CD-ROM drive 3. The pegs 2216 are adapted to insert into the holes 30 for fastening the CD-ROM drive 3. Alternatively, a disengagement of the pegs 2216 from the holes 30 enables a user to easily detach the CD-ROM drive 3 from the frame 2 thereafter.

Referring to FIG. 1 again, in the invention the frame 2 further comprises a latch 25 on a bottom. Also, the case 1 further comprises an interior slit 11 matingly coupled to the latch 25 for securing the frame 2 to the case 1. Alternatively, a disengagement of the latch 25 from the slit 11 enables a user to easily detach the frame 2 from the case 1 thereafter.

Referring to FIG. 2 again, in the invention the frame 2 further comprises at least one protuberance (two are shown) 23 on a side wall opposite the fastening assembly 22. Also, the CD-ROM drive 3 further comprises at least one hole (two are shown) 31 on a side opposite the holes 30. The protuberances 23 are adapted to insert into the holes 31 for fastening the CD-ROM drive 3.

Referring to FIG. 2 again, in the invention the frame 2 further comprises a plurality of parallel ribs 24 on the bottom for strengthening the frame 2.

Referring to FIG. 3 again, in the invention two ridges 2223 are formed in the vertical groove 2220 adjacent both ends of the opening 2221. Also, two slots 2204 are formed on both ends of the sliding piece 2201. The ridges 2223 are adapted to snugly receive in the slots 2204. As such, the provision of the slots 2204 and the ridges 2223 can more precisely guide the sliding member 220 as it moves along the vertical groove 2220.

While the invention has been described by means of specific embodiments, numerous modifications and variations could be made thereto by those skilled in the art without departing from the scope and spirit of the invention set forth in the claims.

What is claimed is:

1. A structure for rapidly detaching or installing a CD-ROM drive from or to a case of a computer, comprising:
   a frame received in a slot of the case of the computer comprising a side opening and an interior cavity in communication with the opening so that the CD-ROM drive can be mounted in the cavity through the opening, and a latch that is matingly coupled with an interior slit provided on the case of the computer for securing the frame to the case or that is disengaged from the latch for detaching the frame from the case;
   an elongated fastening assembly at a side of the cavity, the fastening assembly comprising an elongated sliding member and an elongated fastening member,
   wherein a movement of the sliding member toward or away from the side opening causes the fastening member to move toward or away from the CD-ROM drive for either securing the fastening member to the CD-ROM drive or disengaging the fastening member from the CD-ROM drive.

2. The structure of claim 1, wherein the fastening assembly further comprises an engagement section including a vertical groove provided at a central position thereof parallel to a side wall of the cavity, a first opening through the frame and in a center of the vertical groove, and an upright latch arm at either side of the first opening, the latch arms being parallel to the vertical groove; and a respective groove section adjacent either side of the engagement section, the respective groove sections including two parallel, transverse grooves at both sides of either groove section, the transverse grooves being perpendicular to the vertical groove, and a substantially elliptical limiting slot in a center of either groove section, the limiting slot being proximate and aligned with the vertical groove and the transverse groove being perpendicular to the vertical groove.

3. The structure of claim 2, wherein the sliding member comprises a sliding piece on an underside, a finger tab on the sliding piece, and a cylindrical projection at either end distal from the sliding piece so that the sliding piece is fitted in the vertical groove when the sliding member is fastened in the engagement section by the latch arms, the finger tab is projected from the frame by passing the first opening, and the cylindrical projections are defined by the limiting slots.

4. The structure of claim 3, further comprising two ridges in the vertical groove adjacent both ends of the first opening, and two slots on both ends of the sliding piece, the slots being adapted to receive the ridges.

5. The structure of claim 2, wherein the fastening member comprises a trough, a guide proximate either end, a rail at either end, a slanted slot on either guide, an abutment surface projected from either guide, the abutment surfaces being parallel to the trough, and at least one peg protruded from either abutment surface so that the slanted slots and the limiting slots are partially overlapped when the rails are fitted in the transverse grooves because the slanted slot is disposed at an angle about the limiting slot.

6. The structure of claim 5, wherein the CD-ROM drive comprises at least one first hole on a side wall thereof, the first hole being adapted to receive the peg for fastening the CD-ROM drive in the frame.

7. The structure of claim 1, wherein the frame further comprises at least one protuberance on a side wall opposite the fastening assembly, and the CD-ROM drive further comprises at least one second hole on a side, the second hole being adapted to receive the protuberance.

8. The structure of claim 1, wherein the computer is a notebook computer.

9. The structure of claim 1, wherein the frame further comprises a plurality of parallel ribs on the bottom for strengthening the frame.

* * * * *